United States Patent Office 3,428,895
Patented Feb. 18, 1969

3,428,895
ELECTRICAL METERING APPARATUS FOR MEASURING ELECTRICAL ENERGY IN THE FORM OF KILOWATT-HOURS AND AMPERE-SQUARED HOURS
Henry Joseph Lovegrove, Barnet, England, assignor to Sangamo Electric Company, Springfield, Ill., a corporation of Delaware
Filed Aug. 20, 1964, Ser. No. 390,830
Claims priority, application Great Britain, Aug. 20, 1963, 32,957/63
U.S. Cl. 324—116    2 Claims
Int. Cl. G01r 15/10, 11/02, 19/16

ABSTRACT OF THE DISCLOSURE

Electric power metering system designed to take into account excessive consumption at irregular intervals by domestic and other consumers, in which the metering arrangement embodies a kilowatt-hour metering means for measuring the actual energy consumed and further metering means which concurrently registers the square of the total current flow multiplied by time. The second metering means effectively introduces a square law term into the data upon which the levied charges are calculated and by which each consumer pays an increasing amount for any power which he consumes at a rate which is beyond a predetermined value and also ensures that a charge is made for the reactive current component of the energy supplied.

---

This invention relates to the measurement of electric power supply and is more particularly concerned with an improved method of and apparatus for metering electrical energy supplied to a consumer from a supply network such as a public supply main.

The conventional method for measuring electric power supply is by the use of a kilowatt-hour meter, the charge levied on the consumer being usually composed of a fixed charge of predetermined amount per interval of metering time, such as a month or three months, mainly to meet capital expenditure and maintenance costs plus a charge of so much per kilowatt-hour (kwh.) of energy actually consumed during such metering interval. There are, of course, many variants of this basic charging scheme such as by alteration of the kwh. unit charge rate after a chosen number of kwh. have been consumed within the aforesaid metering interval.

Such a method has certain disadvantages. One of these is that it takes no account of any variation in the rate of energy consumption by the consumer while another is that, as the reactive, wattless, current is not measured by a kilowatt-hour meter, the use of low power factor equipment by the consumer does not alter the amount of the charge levied although such reactive current requires to be generated and distributed.

Variation of the rate of energy consumption, more particularly excessive consumption, can be the cause of great difficulty to both the supplier (by reason of the possible insufficiency of operative generating capacity) and to the consumer (by reason of possible voltage reduction or load shedding when the demand exceeds the operative generating capacity). The increasing use of all kinds of domestic electric appliances, many of which have a power factor appreciably displaced from unity, is tending to make the reactive current component of increasing concern to suppliers.

To deal with rate variation it is already well known to employ a maximum demand meter as a means for checking the unexpected excessive use of electricity but the complication and cost of such meters has hitherto limited their use to the metering of energy supplied to relatively large consumers such as industrial concerns. Such devices also have an objection in that they tend to give an unequitable result since any consumption above the chosen predicted demand value, for however short a period, results in an increased charge for all of the energy consumed during the metering interval in which such excessive consumption occurs. To deal with the reactive current problem, use has already been made of the kvA. meter as a means of determining the reactive current component but again such meters serve only to show when a change of tariff rate is to come into force. Again such kvA. meter is hardly suitable for widespread use with a large number of relatively small consumers such as domestic consumers.

Objects of the present invention includes the provision of an improved method of and apparatus for metering the supply of electrical energy by means of which a suitably increased charge can be assessed and levied upon each consumer to take account of unexpectedly increased rate of energy consumption for only relative short periods and also to take account of the reactive component of consumption in a relatively simple manner which does not demand a high capital cost of metering equipment for each consumer.

Broadly in accordance with the invention a system of measurement of what may be termed "proportional demand" is employed in which the energy supplied to each consumer is by way of a metering arrangement which embodies a conventional kilowatt-hour metering means for measuring the actual energy consumed and further metering means which registers the square of the total current flow multiplied by time. The second metering means effectively introduces a square law term into the data upon which the levied charge is assessed and ensures that each consumer pays an increasing amount for any power which he consumes at a rate which is beyond a predetermined value and also ensures that charge is made for the reactive current component of the energy supplied.

The two metering means may be quite separate meters or they may be in the form of a compound meter. The use of a separate meter is advantageous for the adaptation of existing installations since it merely involves the addition of a further meter of comparatively simple and cheap form for use in conjunction with the existing kilowatt-hour meter. The second, compound, form is suitable for new installations since it provides a metering device which may be cheaper than the combined cost of a kilowatt-hour meter and a current-squared time meter.

The method and arrangements are also adaptable to the metering of energy supplied over polyphase circuits, the total $I^2$ flowing in all phases being measured and added in assessment of the levied charge. In such polyphase metering any consumer who allows his load to become seriously unbalanced suffers the penalty by increase of the measured $I^2h$ value.

The actual form of tariff for supply of electrical energy using the method and arrangements according to the invention can, of course, be varied widely in accordance with the requirements of the particular supply authority and the governing local conditions.

In order that the nature of the invention may be more readily understood a number of embodiments thereof will now be described by way of illustrative example with reference to the accompanying drawings in which.

Figure 1:
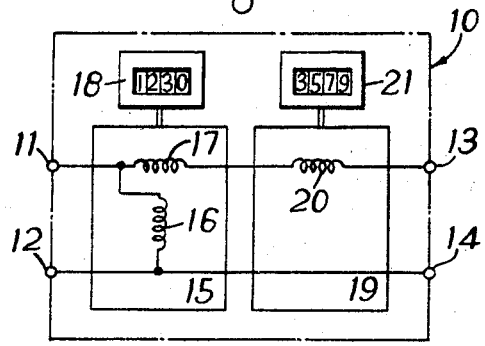
FIGURE 1 is a block schematic diagram illustrating the basic elements of one form of metering apparatus according to the invention.

Referring first to FIG. 1, the metering apparatus arrangement for use with a single phase alternating current supply is indicated collectively by the chain-dot line rectangle 10 and comprises input terminals 11, 12 for connection to the supply conductors and output terminals 13, 14 for connection to the consumer's load circuit. Reference numeral 15 indicates a kilowatt-hour meter mechanism comprising a potential coil winding 16 and a current coil winding 17, for metering the energy supplied therethrough and for providing a visible indication of the integrated kwh. value on a suitable register 18. Reference numeral 19 indicates further meter mechanism for registering the square of the total current ($I^2$) multiplied by time ($h$) and comprises a current coil winding 20, the total $I^2h$ value being registered on a register 21. The respective current coil windings 17 and 20 are shown connected in series between the input terminal 11 and output terminal 13 while the potential coil winding 16 is connected across the input terminals 11, 12. The other input terminal 12 is connected directly to the output terminal 14.

The kwh. meter mechanism 15 may be of any well known form while the $I^2h$ metering means 19 may likewise be of any of the several known forms of such a device. The conventional form of watt-hour meter may be adapted to measure ampere-squared-hours by removal of the usual potential coil and its replacement by a coil or coils which are arranged also to carry the main load current so as to produce a magnetic flux in the electromagnet-gap which is suitably phase-shifted with relation to the magnetic flux produced by the other coil winding, i.e. that which forms the normal watthour meter series or current element. By this means a torque is established by the interaction of the two main-current produced magnetic fluxes and the respective generated eddy currents in the rotor disc of the meter.

As in all induction type instruments, errors are introduced with changes in frequency and ambient temperature and these may be compensated by the application of conventional methods using electrical and/or magnetic means. Similar compensation means, are of course, also provided in the kwh. meter mechanism 15.

Figure 2:
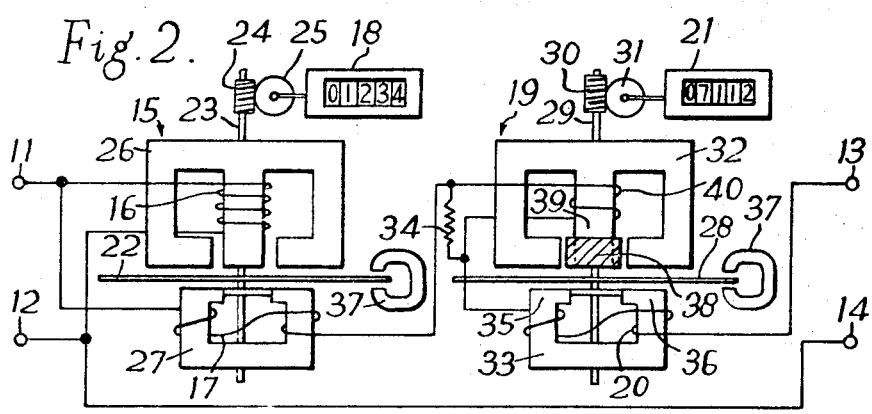
FIGURE 2 is a more detailed but largely schematic diagram of one form of metering arrangement in accordance with the invention.

FIG. 2 illustrates in greater detail one embodiment of the invention in which the kwh. meter mechanism 15 includes a rotor disc 22 mounted on a vertical spindle 23 carrying a worm 24 which drives a gear 25 coupled to and serving to operate the register 18. The latter is shown as being of the step-by-step actuated number wheel type but any other suitable known form of register, such as a plurality of rotatable pointer arms, may be used instead. Above the rotor disc 22 is disposed a tri-polar first magnetic core 26 carrying the potential coil winding 16 around its central limb while below the disc 22 is disposed a second, substantially U-shaped magnetic core 27 carrying the series or current coil winding 17. A stationary braking magnet 37 co-operates with the rotor disc 22 in the usual way.

The construction of the $I^2h$ meter mechanism 19 is generally similar to that of the kwh. mechanism 15 in that it also includes a rotor disc 28 co-operating with a stationary braking magnet 37 and carried by a vertical spindle 29 having a worm 30 in meshing engagement with a gear 31 coupled to and serving to operate the register 21 and a first tri-polar magnetic core 32 above the rotor disc and a second bi-polar magnetic core 33 below such disc. The central pole 39 of the first magnetic core 32 is provided with a winding 40 of a suitable small number of turns, which winding 40 is shunted by a resistance 34 and is connected in series with the main series element or current winding 20 of the second magnetic core 33. The effect of this construction is to produce a phase shift between the flux produced by the auxiliary winding 40 on the pole 39 and the flux produced by the winding 20 thereby establishing a torque in the disc 28. The amount of phase shift and hence the torque produced is determined by the value of the resistance 34 and the inductance of the winding 40. If desired, a phase band 38 in the form of a copper short-circuited ring may encircle the lower end of the pole 39 as shown. The number of turns forming the respective winding sections embracing the left and right limbs 35 and 36 of the second magnetic core 33 may be unbalanced (with a greater number of turns on the right hand limb) as a further means of increasing the available torque.

Although one specific form of $I^2h$ meter mechanism has been shown and described, it will be understood that other constructions are already known and may be used instead. For example, the upper tri-polar core 32 may be devoid of any winding and the left hand limb 35 of the second core 33 provided with an encircling phase band as well as its winding 20. In another construction the centre pole 39 of the first core 32 may be provided with a winding in series with the current element of the kwh. meter 15 and also provided with a second winding which is connected in a closed series loop circuit with the winding 20 on the second core 33

In the practical application of the metering arrangements so far described the indication provided on the $I^2h$ meter register 21 is used, by its relation to the reading on register 18, to determine the demand and therefrom to modify the charge to the consumer for the actual amount of energy indicated on the kwh. meter register 18. The precise manner in which the charge modification is made is clearly a matter for decision by the designer of the supplier's tariff.

For any given energy consumption over a period of time as registered on the kwh. meter mechanism 15, the associated $I^2h$ meter mechanism 19 will provide an indication which is lowest when a constant energy flow has taken place over the whole of the said time period and this indication will increase on a square law basis as such energy supply is provided at increased rates for only a fractional part of the said time period. To quote an ultra simple example by way of explanation—if a consumer on a 200 v. supply takes constant current of 1A during the whole of a 30-day period, the kwh. meter 15 will register 144 kwh. and the $I^2h$ meter will register 720. If, however, such consumer, during the same 30-day period, takes a current of 2A for only half of the time (360 hours) his kwh. meter 15 will still register 144 kwh. but his $I^2h$ meter 19 will now register 1,440 ($2 \times 2 \times 360$). Similarly if he takes the same total amount of energy at the rate of 4A for only 180 hours of the 30-day period, his kwh. meter reading will still be 144 kwh. but his $I^2h$ meter will now register 2,880 ($4 \times 4 \times 180$).

By relating the particular $I^2h$ meter reading to the actual kwh. of energy consumed it is possible for the supplier to apply a suitable loading factor to the charge rendered to the consumer to give a minimum charge rate when a constant supply is taken and a progressively increased charge rate as the supply is taken for shortened periods of time at a correspondingly higher level. A wide variety of tariff schemes is clearly possible and may take into account particular requirements to promote or discourage the consumption of energy.

Figure 3:
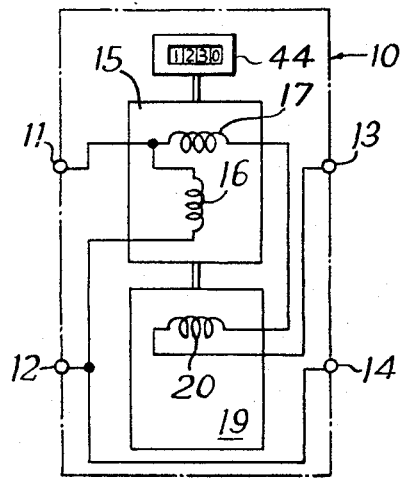
FIGURE 3 is a block schematic diagram illustrating another basic form of metering apparatus according to the invention.

As an alternative to the use of separate kwh. and $I^2h$ meter mechanisms as so far described, a single mechanism of the form indicated schematically in FIG. 3 may be employed where the apparatus 10 comprises a kwh. meter mechanism 15 and an $I^2h$ meter mechanism 19 arranged to operate a single register 44. Such combined meter mechanisms may take the form of a single rotor disc operated upon at spaced positions by separate kwh. and I²h metering arrangements, e.g., of any of the forms already referred to collectively at 15 and 19 or arrangements each employing its own rotor disc may have the latter mounted on a common spindle to operate a single register. In yet another form a normal watthour meter construction may be suitably modified to effect combined registration of the two above-mentioned factors. The two terms of kwh. and I²h are then registered on the common register 44.

Figure 4:
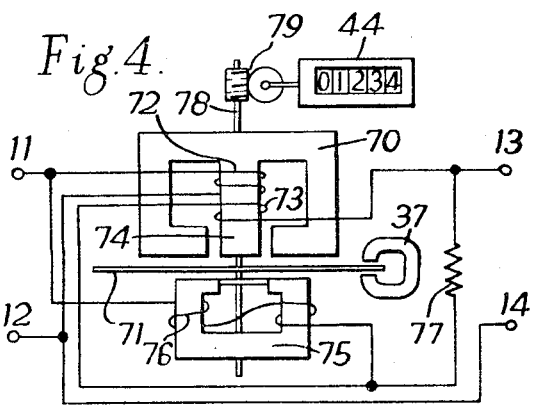
FIGURE 4 is a more detailed but largely schematic diagram of one apparatus arrangement of the basic form shown in FIG. 3.

FIG. 4 illustrates one example of such combined or compound form of metering device. In this embodiment a first, tri-polar magnetic core 70 located above a rotor disc 71 has a first coil winding 72 and a second coil winding 73 around the central pole 74. A second U-shaped or bi-polar magnetic core 75 located below the disc 71 has a coil winding 76 divided in the usual way into two parts embracing the respective poles of such core 75. The coil winding 72 is, effectively, the equivalent of the potential element of the kwh. meter of FIG. 2 and is accordingly connected across the input terminals 11, 12. The second coil winding 73 is shunted by a resistance 77 and forms effectively, the equivalent of the winding 40 of FIG. 2 and, in a manner analogous to that figure, is connected in series with the coil winding 76 and the two windings arranged in the connection between the input terminal 11 and the output terminal 13. Terminals 12 and 14 are directly interconnected.

Such a construction is obviously a combination of the two separate metering means of FIG. 2 to be effective upon the single rotor disc 71, the amount of additional torque and hence additional rotation of the disc due to the I²h component being controllable and varied according to requirements by suitable choice of the value of the resistance 77 and the number of turns in the winding 73. The disc 71 is secured to the single spindle 78 which drives the register 44 through worm and wormwheel gearing 79. 37 denotes the brake magnet as before.

The last described single register arrangements automatically introduce a suitable loading factor into the registered energy consumption amount which, it will be noted, is not in kwh. or other standard units but in arbitrary units whose energy content is progressively reduced as the rate of consumption become less constant. Such arbitrary units, can, therefore, be charged at a chosen constant price.

In the application of the invention to polyphase, e.g. three, phase metering, the kwh. meter means may be of any known form, e.g. of the multiple-element single-disc type or of the single-element multipledisc-type. Similarly the I²h metering means may compromise three in either a single disc or in a multiple disc meter. It is essential that an ampere-squared hour meter or meter element is incorporated in such supply line of a polyphase system since there is no association with the supply voltage measurement at this point.

Figure 5:
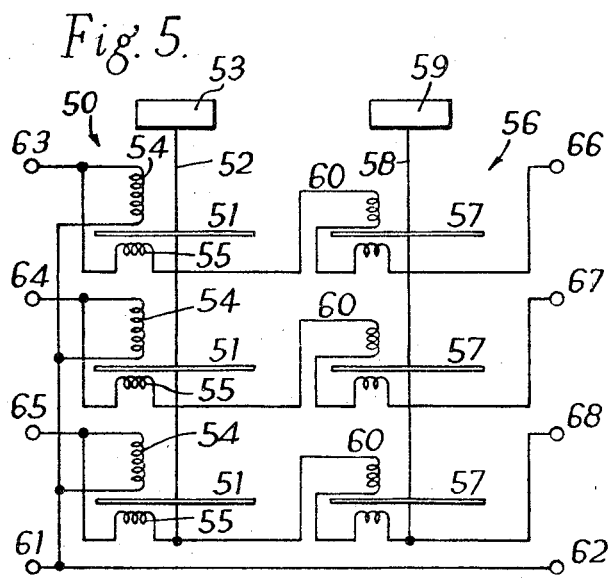
FIGURE 5 is a schematic diagram of one form of metering apparatus in accordance with the invention for use in a three-phase supply circuit.

FIG. 5 shows, by way of example only, one three phase metering arrangement according to the invention and in which the kwh. meter mechanism indicated generally at 50 comprises three rotor discs 51 on a common spindle 52 which is in geared connection with a kwh. register 53. Each rotor disc 51 is associated with a magnetic core assembly provided with a potential coil winding 54 and a current coil winding 55. The I²h meter mechanism 56 similarly comprises three rotor discs 57 on a common spindle 58 which is in geared connection with a single register 59. Each disc is associated with a magnetic core assembly provided with windings 60. The neutral or star point input terminal 61 is directly connected to the corresponding output terminal 62 while the respective phase input terminals 63, 64, 65 are each connected through the related potential coil windings 54 to the input terminal 61 and by way of the related coil windings 55 and 60 in series to the corresponding phase output terminals 66, 67, 68. Although not shown the rest of the construction is of conventional form. Such polyphase arrangements may clearly be of other suitable known form while, as with the described single phase arrangements, the kwh. and I²h meter means may be combined and arranged to operate a single common register either by joint co-operation with a common rotor disc or by coupling of all rotor discs to a common spindle or by compounding in a manner analogous to FIG. 4.

I claim:
1. Electric power supply metering apparatus which comprises the combination for simultaneous operation by the same energy flow, of an electric watthour meter and an ampere-squared-hour meter, a rotor element, integrating register means in geared connection with said rotor element, braking means effective on said rotor element, watthour metering means comprising a potential element and a current element each operative to cause movement of said rotor element in a given direction when energized, and ampere-squared-hours metering means comprising a current element also operative upon said rotor element to cause movement thereof in the same given direction.

2. An electric power supply metering device comprising a rotatable conductive disc, a first tri-polar magnetic core on one side of said disc, a second bi-polar magnetic core on the opposite side of said disc, first and second windings around the central pole of said first core, a third winding on said second core, a resistance shunting said second winding, a stationary brake magnet effective to brake said disc, an integrating register coupled to said disc for operation thereof by rotation of said disc, first and second input terminals, first and second output terminals and circuit means connecting said first input terminal to said second input terminal through said first winding, said first input terminal to said first output terminal through said second and third windings in serial relation and said second input terminal directly to said second output terminal, said first, second and third windings providing metering means which produce a unidirectional torque for said disc which is determined by the actual energy consumed and the I²h component.

References Cited

UNITED STATES PATENTS

| | | | |
|---|---|---|---|
| 1,291,110 | 1/1919 | Perdrisat et al. | 324—137 |
| 1,659,549 | 2/1928 | Kinnard et al. | 324—140 |
| 1,670,089 | 5/1928 | Walsh | 324—140 |

OTHER REFERENCES

Kinnard, I. J.: "Applied Electrical Measurements," 1956, pp. 200 and 201.

RUDOLPH V. ROLINEC, *Primary Examiner.*

E. F. KARLSEN, *Assistant Examiner.*

U.S. Cl. X.R.

324—103, 137, 143